United States Patent
Kassner et al.

(10) Patent No.: US 11,325,471 B2
(45) Date of Patent: May 10, 2022

(54) METHOD FOR DISPLAYING THE COURSE OF A SAFETY ZONE IN FRONT OF A TRANSPORTATION VEHICLE OR AN OBJECT BY A DISPLAY UNIT, DEVICE FOR CARRYING OUT THE METHOD, AND TRANSPORTATION VEHICLE AND COMPUTER PROGRAM

(71) Applicant: VOLKSWAGEN AKTIENGESELLSCHAFT, Wolfsburg (DE)

(72) Inventors: Astrid Kassner, Berlin (DE); Matthias Henning, Berlin (DE); Norwin Schmidt, Westerland (DE)

(73) Assignee: Volkswagen Aktiengesellschaft

(*) Notice: Subject to any disclaimer, the term of this patent is extended or adjusted under 35 U.S.C. 154(b) by 0 days.

(21) Appl. No.: 16/766,311

(22) PCT Filed: Nov. 1, 2018

(86) PCT No.: PCT/EP2018/079958
§ 371 (c)(1),
(2) Date: May 22, 2020

(87) PCT Pub. No.: WO2019/101491
PCT Pub. Date: May 31, 2019

(65) Prior Publication Data
US 2020/0369149 A1    Nov. 26, 2020

(30) Foreign Application Priority Data
Nov. 27, 2017  (DE) ............... 10 2017 221 191.1

(51) Int. Cl.
G08G 1/09       (2006.01)
B60K 35/00      (2006.01)
G06T 11/00      (2006.01)

(52) U.S. Cl.
CPC ............ *B60K 35/00* (2013.01); *G06T 11/001* (2013.01); *G08G 1/09* (2013.01);
(Continued)

(58) Field of Classification Search
CPC ........... B60W 50/14; B60W 2050/143; B60W 2050/146; B60W 30/16
See application file for complete search history.

(56) References Cited

U.S. PATENT DOCUMENTS 7,136,754 B2   11/2006  Hahn et al.
8,686,872 B2   4/2014   Szczerba et al.
(Continued)

FOREIGN PATENT DOCUMENTS

CN   102568231 A   7/2012
CN   103732480 A   4/2014
(Continued)

OTHER PUBLICATIONS

Search Report for International Patent Application No. PCT/EP2018/079958; dated Feb. 18, 2019.

*Primary Examiner* — Benyam Haile
(74) *Attorney, Agent, or Firm* — Barnes & Thornburg, LLP

(57) ABSTRACT

A method for displaying a safety zone in front of a transportation vehicle or object. The safety zone is shown on a display unit. The safety zone is displayed as a grid and the end of the grid that is remote from the transportation vehicle indicates the end of the safety zone at the measured speed, taking into consideration the determined driving situation.

16 Claims, 9 Drawing Sheets

(52) U.S. Cl.
CPC ............... *B60K 2370/1529* (2019.05); *B60K 2370/179* (2019.05); *B60K 2370/193* (2019.05); *B60K 2370/31* (2019.05)

(56) References Cited

U.S. PATENT DOCUMENTS

| | | | |
|---|---|---|---|
| 9,605,971 B2 | 3/2017 | Niehsen et al. | |
| 2007/0118282 A1* | 5/2007 | Yamamoto | G08G 1/163 |
| | | | 701/1 |
| 2016/0313562 A1* | 10/2016 | Saisho | B60R 1/00 |
| 2018/0128635 A1* | 5/2018 | Nakamura | B60W 30/12 |
| 2020/0302657 A1* | 9/2020 | Shimazu | H04N 7/18 |

FOREIGN PATENT DOCUMENTS

| | | |
|---|---|---|
| DE | 19940718 C1 | 5/2001 |
| DE | 10317044 A1 | 10/2004 |
| DE | 102005046756 A1 | 4/2007 |
| DE | 102006032770 A1 | 1/2008 |
| DE | 102007016868 A1 | 10/2008 |
| DE | 102008013981 A1 | 9/2009 |
| DE | 102011121763 A1 | 6/2013 |
| DE | 102012222380 A1 | 6/2014 |
| DE | 102013016242 A1 | 4/2015 |
| DE | 102013016242 A1 * 4/2015 ............ G08G 1/166 |
| DE | 102015204122 A1 | 11/2015 |
| GB | 2419118 A | 4/2006 |
| JP | 2008084072 A | 4/2008 |
| WO | 2005053991 A1 | 6/2005 |
| WO | 2017053616 A1 | 3/2017 |

\* cited by examiner

METHOD FOR DISPLAYING THE COURSE OF A SAFETY ZONE IN FRONT OF A TRANSPORTATION VEHICLE OR AN OBJECT BY A DISPLAY UNIT, DEVICE FOR CARRYING OUT THE METHOD, AND TRANSPORTATION VEHICLE AND COMPUTER PROGRAM

PRIORITY CLAIM

This patent application is a U.S. National Phase of International Patent Application No. PCT/EP2018/079958, filed 1 Nov. 2018, which claims priority to German Patent Application No. 10 2017 221 191.1, filed 27 Nov. 2017, the disclosures of which are incorporated herein by reference in their entireties.

SUMMARY

Illustrative embodiments relate to the technical field of driver information systems, which are also known under the term infotainment system. Illustrative embodiments relate, in particular, to a method for displaying a safety zone in front of a transportation vehicle or an object on a display unit. Such systems are used primarily in transportation vehicles. However, it is also possible to use the illustrative embodiments in the case of pedestrians, cyclists, etc., using smartglasses. Illustrative embodiments furthermore relate to a correspondingly designed apparatus for performing the method and to a transportation vehicle and to a computer program.

BRIEF DESCRIPTION OF THE DRAWINGS

Exemplary embodiments are illustrated in the drawings and will be explained in more detail below with reference to the figures, in which.

DETAILED DESCRIPTION

Figure 1:
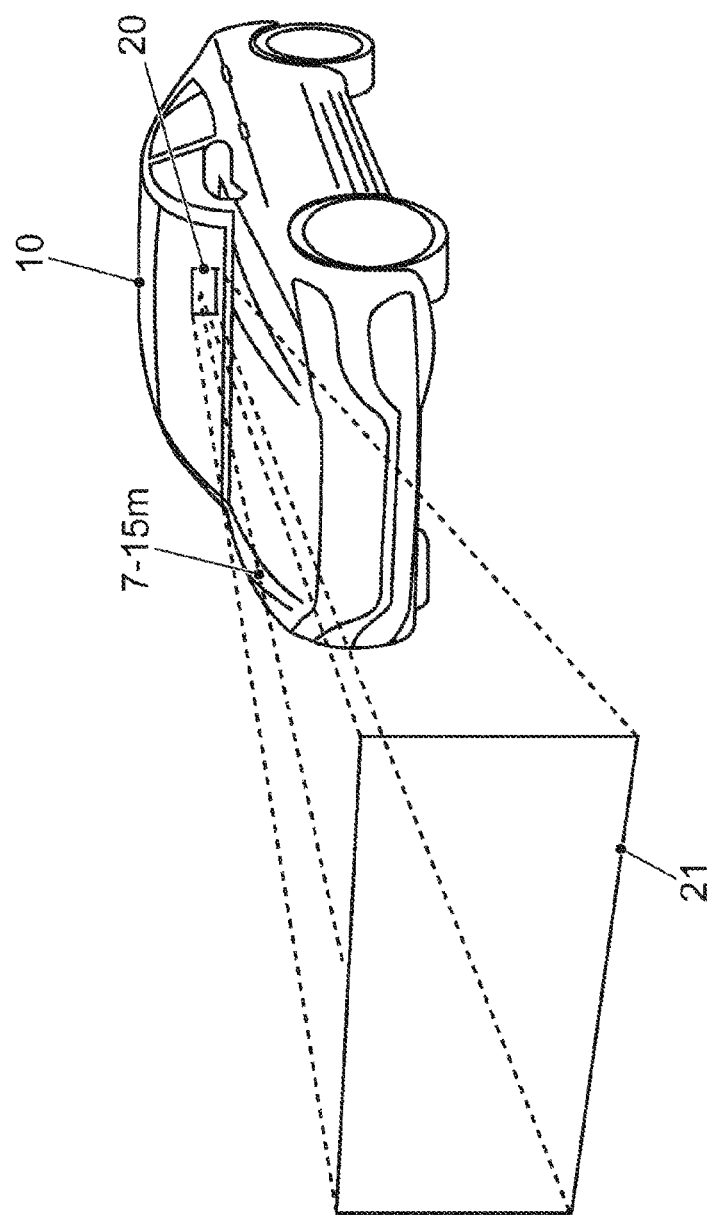
FIG. 1 shows the principle of the superposition of information onto the field of view of the driver of a transportation vehicle during the journey with the aid of a head-up display.

Intensive work relating to technologies that are intended to make autonomous driving possible in the future is currently underway. A first approach is here not to completely relieve the driver of their tasks but to ensure that the driver can assume control of the transportation vehicle at any time. The driver additionally performs monitoring functions. Owing to recent technologies in the field of driver information systems such as head-up displays (HUD), it is possible to better inform the driver about the events in the vicinity of their transportation vehicle.

It should therefore be assumed that, in the near future, comprehensive information relating to objects (in particular, transportation vehicles) in the direct vicinity of one's own transportation vehicle will be available to the system owing to the use of more recent technologies (vehicle-to-vehicle communication, use of databases, transportation vehicle sensor systems, etc.). In the field of transportation vehicle sensor systems, in particular, the following components that make observation of the vicinity possible are mentioned: RADAR devices a.k.a. radio detection and ranging, LIDAR devices a.k.a. light detection and ranging, mainly for the field of distance capturing/warning, and cameras having corresponding image processing for the field of object detection. These data relating to the environment can thus be used as a basis for system-based driver recommendations, warnings, etc. For example, displays/warnings relating to the direction into which another transportation vehicle in the vicinity wishes to turn (possibly into its own trajectory) are thus conceivable.

Vehicle-to-vehicle communication has meanwhile become possible using mobile communication with systems such as LTE a.k.a. long-term evolution. In this respect, the organization 3GPP has issued a specification called LTE V2X. Alternatives available are systems for the transportation vehicle direct communication based on WLAN technology, in particular, the system according to WLAN p.

The term "autonomous driving" is used in different ways in literature.

To clarify this term, therefore the following insertion is presented here. Autonomous driving (sometimes also called automatic driving, automated driving, or piloted driving) is understood to mean the propulsion of transportation vehicles, mobile robots and driverless transport systems that largely act autonomously. There are different levels for the term autonomous driving. In this case, at specific levels, the term autonomous driving is used even if a driver who possibly assumes only the monitoring of the automatic driving procedure is still located in the transportation vehicle. In Europe, the different Departments of Transportations (in Germany, the Federal Highway Research Institute was involved) have collaborated and defined the following autonomy stages.

Level 0: "Driver only," the driver drives, steers, accelerates, brakes etc.

Level 1: specific assistance systems assist in the operation of the transportation vehicle (including a distance regulation system—automatic cruise control ACC).

Level 2: partial automation. Inter alia automatic parking, lane-keeping function, general longitudinal control, acceleration, braking etc. are performed by the assistance systems (including traffic jam assistant).

Level 3: high automation. The driver is not required to permanently monitor the system. The transportation vehicle performs functions independently, such as triggering the indicator, lane change and lane keeping. The driver can concern themselves with other things but will be requested to assume control if required within a pre-warning time. This form of autonomy is technically realizable on motorways. The legislature is working toward licensing level 3 transportation vehicles. The legal boundary conditions have already been created herefor.

Level 4: full automation. The control of the transportation vehicle is performed permanently by the system. If the driving tasks can no longer be managed by the system, the driver may be requested to assume control.

Level 5: no driver necessary anymore. Except for setting the destination and starting the system, no human intervention is required.

Automated driving functions starting from level 3 relieve the driver of the responsibility for controlling the transportation vehicle.

Owing to the current development toward higher autonomy levels, but where many transportation vehicles continue to be controlled by drivers, it should be assumed that corresponding additional information can already be used in the medium term for manually controlled transportation vehicles and not only in the long run for highly automated systems.

For the driver-vehicle interaction, the question is here how this information can be represented in a manner such that a real added value is created for the human driver and they will be able to quickly, or intuitively, localize the provided information. The following solutions in this area are here already known from the prior art.

It is a future vision in the automotive industry to be able to reproduce virtual elements on the windshield of one's own transportation vehicle to offer the driver a few benefits. What is known as "augmented reality" technology (AR technology) is used here. The corresponding German term "erweiterte Realität" is less well-known. In this case, the real surroundings are enriched with virtual elements. This has several benefits: it obviates the need to look down at displays other than the windshield because many relevant pieces of information will be imaged onto the windshield. The driver therefore has no need to take their gaze off the road. In addition, owing to the position-accurate localization of the virtual elements in the real environment, less cognitive effort on the part of the driver is likely because there is no need to interpret a graphic on a separate display. With respect to automatic driving, it is likewise possible to create added value.

Since the technological methods and mechanisms nowadays are correspondingly limited, it should be assumed that, in the medium term, no windshields that are capable of full reproduction be available in transportation vehicles. Currently, head-up displays are used in transportation vehicles. The head-up displays also have the benefit that the image of the HUD appears to be closer to the real environment. These displays are actually projection units that project an image onto the windshield. However, from the view of the driver, this image is located a few meters up to 15 meters in front of the transportation vehicle, depending on the construction type of the module.

The "image" is here composed of the following: it is less a virtual display but rather a type of "keyhole" into the virtual world. The virtual surroundings are theoretically overlaid on the real world and contain the virtual objects that assist and inform the driver during the journey. Due to the limited display area of the HUD, a section thereof can be seen. In other words, the section of the virtual world is seen through the display area of the HUD. Since these virtual surroundings supplement the real surroundings, the term "mixed reality" is also used in this case.

DE 10 2007 016 868 A1 discloses a method for displaying a course of the road in front of a transportation vehicle, wherein a current speed of the transportation vehicle is determined. In this case, points of transportation vehicle surroundings located in front of the transportation vehicle are determined so that an optical flow of these points is determined taking into account the current transportation vehicle speed and that symbols for representing the optical flow for a representation of the course of the road are superposed onto the head-up display.

WO 2005/053991 A1 discloses a method and a system for assisting a path control method. The method and the system serve for assisting path control, and of a transportation vehicle on a road or in an off-road environment or of a ship or an aircraft. The method here consists in the performance of at least one of the following operations (a) and (b): (a) estimating an actual future path of the transportation vehicle based on transportation vehicle movement data and optical and/or acoustic and/or tactile indication of the estimated actual future path to the driver, (b) capturing the actual current path of the transportation vehicle, estimating a current deviation of the detected actual current path from a desired current path and optical and/or acoustic and/or tactile indication of the estimated current deviation to the driver.

DE 10 2012 222 380 A1 discloses a stereoscopic head-up display, in which a light-technological parameter of the display unit, such as brightness and background color of the surroundings of the transportation vehicle, is determined only based on the position of the transportation vehicle, ascertained precipitation at the position of the transportation vehicle, ascertained ambient temperature at the position of the transportation vehicle, a piece of time information, and/or at least one value of an external data source.

DE 10 2006 032 770 A1 discloses a transportation vehicle having a head-up display, in which a braking distance of the transportation vehicle is displayed with the head-up display. To immediately communicate the length of the braking distance to the driver, that fictitious point at which the transportation vehicle would come to a standstill as a result of the initiated braking operation is visualized in the head-up display using a projected crossbar. The current braking distance may be displayed not only during an actual braking operation, that is to say when the brake pedal is being depressed, but permanently during the entire driving operation.

DE 10 2011 121 763 A1 discloses a method for representing distance information on a display apparatus of a transportation vehicle. The method is characterized in that a real image of the road located in front of the transportation vehicle is recorded with a camera and a safety distance from the transportation vehicle driving ahead is ascertained based on at least one driving-dynamic variable of the transportation vehicle. The real image is supplemented by a virtual image component, such as a crossbar, which indicates the safety distance in a correct location with respect to the transportation vehicle driving ahead.

GB 2 419 118 A discloses a head-up display system in which an illuminated horizontal line or a band is projected onto a transportation vehicle windshield to display to the driver a safety distance at which they should follow the transportation vehicle driving ahead at their speed.

A major benefit of the "augmented reality" displays (AR displays) which are known to date consists in the representation of the corresponding displays directly within or as part of the environment. Relatively obvious examples typically relate to the area of navigation. While conventional navigation displays (in conventional HUDs) generally display schematic representations (for example, an arrow extending at a right angle to the right to indicate that a right turn should be taken at the next opportunity), AR displays offer significantly more effective possibilities. Since the displays can be represented as "part of the environment," extremely fast and intuitive interpretations are possible for the user. However, the approaches known to date also entail various problems for which no solutions are currently known.

The known solutions are afflicted with various drawbacks. This was discovered as part of the disclosure. In the known solutions, the problem arises that, depending on ambient conditions, in particular, of the driving situation, the representation of the safety zone is either difficult to see or is simply too conspicuous and distracts from the actual events occurring on the road.

There is thus the need for further improvements in the display of a safety zone in front of the transportation vehicle, which is to be adapted variably to the ambient conditions so that distractions for the driver cannot arise.

The disclosed embodiments find such an approach. A further object is that, in the reverse, it is to be prevented that the course of the driving direction is represented too weakly in the case of specific ambient conditions, meaning it is difficult for the driver to follow the course.

This is achieved by a method for displaying a safety zone in front of a transportation vehicle or an object with the aid of a display unit as claimed in claim 1, by an apparatus for performing the method as claimed in claim 12, and by a transportation vehicle as claimed in claim 14 and a computer program as claimed in claim 15.

The disclosed embodiments dispense with obscuring areas and instead create the representation of the safety zone in a fragmented form. A number of benefits can be seen in this procedure, which, in addition to meeting the requirements of a low degree of obscuration of the environment and at the same time adequate error tolerance, consist of the fact that the human perception apparatus due to the evolution-biological requirements is easily capable of understanding the individual display elements as a contiguous message. The representation of the safety zone may be a grid, wherein the end of the grid that is remote from the transportation vehicle indicates the end of the safety zone at the measured speed and optionally taking into account the captured ambient conditions. Up to the end of the safety zone, the driver could still bring the transportation vehicle to a stop taking into consideration the ambient conditions and the appropriate reaction time.

In a disclosed embodiment, the representation of the safety zone is calculated such that it illustrates the instantaneous braking distance or stopping distance of the transportation vehicle. If the speed of the transportation vehicle and/or the ambient conditions, such as precipitation situation, temperature, humidity, change, the braking distance, and correspondingly also the representation of the safety zone, will also change.

In a further disclosed embodiment, a reduced form of the grid is represented if a driving situation has been assessed as being non-hazardous on the basis of the capturing of the surroundings, wherein only the corner points of the grid are displayed. This has the benefit that the representation of the safety zone recedes into the background, and the driver, although they can make out the dimensions of the safety zone if they consciously look for it, is otherwise not bothered by the superposition of the safety zone.

In the reverse, if a driving situation has been assessed as demanding increased attention by the driver, the grid is represented in full and, in addition, depending on the situation, a virtual stopping line is superposed at a location of the driving path in front of the superposed grid at which the increased attention of the driver is required. Every time the safety zone becomes visible in a complete grid form, this is a message for the driver to pay increased attention. When the stopping line is superposed, the driver can already prepare for a braking operation and, for example, "ease up on the gas."

Typical driving situations that are assessed as demanding increased attention of the driver correspond to driving on a street without priority while approaching a crossroad or junction with priority that must be observed, such as right before left, stop street or priority road. The complete superposition of the grid would also be suitable in other driving situations. Further examples are: sudden braking by the transportation vehicle in front, the occurrence of unevennesses on the road such as potholes, cobblestone etc., and other situations that make it necessary for the driver to act to effect a change in speed or a steering intervention, action, for example: animals or people on the road or obstacles on the road.

As a further measure with which the attention of the driver can be increased, the grid is additionally represented with color emphasis in the case of a driving situation that predicts another road user entering the safety zone in front of the transportation vehicle.

The coloration in a further configuration can be dynamic, where the grid points are radially colored from the direction from which the other road user is likely to enter the safety zone in front of the transportation vehicle. In this way, it is possible to intuitively make visible for the driver the direction from which danger looms.

In addition, if the transportation vehicle approaches the virtual stopping line, the grid can be calculated such that it is superposed in a compressed form so that all grid points are positioned in front of the stopping line if the location of the grid was calculated such that the transportation vehicle-remote end of the grid has reached the stopping line. The grid thus does not move into the junction or turning. Using the compression, the attention is directed to the stopping line which, in contrast to the "vehicle-based" grid, is localized at a specific location on the road (road-based). The length of the grid may no longer be able to visualize the braking distance due to the compression, but this procedure provides the driver with the information that is essential in the situation, specifically the location on the road at which they must absolutely come to a stop. The compression of the grid is affected whenever the stopping distance is greater than the distance from the obstacle. The obstacle can be the virtual stopping line, but it can also be the transportation vehicle ahead that is braking, for example. In that case, the grid is compressed to the extent that it ends in front of the transportation vehicle driving ahead.

Further increased attention can be achieved in the next escalation stage, by additionally coloring the virtual stopping line.

At the same time, or as a further escalation stage, it is possible to even more strongly draw attention to the dangerous situation by superposing one or more action request symbols in addition to the coloration of the virtual stopping line. In this way, the driver is then very urgently made aware of the necessity to initiate the braking operation. Optionally, a braking request symbol is used as the action request symbol.

The action request symbol may be superposed such that it is represented as floating over the virtual stopping line. This ensures that this symbol remains visible owing to its height above the street surface even if the augmented stopping line is located so close in front of the transportation vehicle that it can no longer be displayed in the field of view of the head-up display.

It is beneficial for an apparatus for performing the method if it has a display unit with which virtual additional information can be superposed into the field of view of the driver or of the person operating the object. This is the case in a head-up display and also in smartglasses. This apparatus should furthermore have a computation unit and capturing methods or mechanisms. The capturing methods or mechanisms are used to capture the speed and the surroundings and also optionally further environmental conditions. The computation unit is designed here to calculate a grid based on the speed and/or on the captured surroundings/environmental conditions for displaying the safety zone, wherein the vehicle-remote end of the grid indicates the end of the safety zone. To detect other transportation vehicles, road users, obstacles, etc., the surroundings are captured. The very accurate capturing of the transportation vehicle's own position in the surroundings is likewise important. This is beneficial to make "register-exact" augmentation possible. This also includes capturing the future course of the road, because the display of the grid should adapt to the course of the road and should not be located in a bend next to the road. In this connection, data relating to the control operation of the transportation vehicle, such as its own steering angle, use of the "blinker" or a cross track distance within the road, should be captured and taken into account so that the grid can be superposed correctly on the future trajectory of the transportation vehicle, for example, when changing lanes.

Environmental conditions that can be captured are weather conditions such as types of precipitation: rain, heavy rain, snow, hail or mist/fog. The visibility conditions can also be captured thereby. The prerequisite is the presence of a corresponding sensor system. Alternatively, a highly accurate weather report can also be used, for example, one retrieved from the Internet.

It is particularly beneficial if the display unit is a head-up display. Instead of a head-up display, smartglasses or a monitor can be used in the apparatus as the display unit on which a camera image onto which the grid is superposed is displayed.

The disclosed apparatus can be used in a transportation vehicle. The disclosed embodiments may be realized in the transportation vehicle such that the display unit is fixedly mounted in the transportation vehicle, for example, as a head-up display. Nevertheless, one possible form of realizing the disclosed embodiments would also be possible with the aid of smartglasses if the use of smartglasses were permitted for the driver in future.

As mentioned, the disclosed embodiments can also be used if the display unit is smartglasses. In that case, the disclosed method can be used even in the case of pedestrians, cyclists, motorcyclists, etc.

For a computer program executed in the computation unit of the apparatus, for performing the disclosed method the corresponding benefits apply as were described relating to the disclosed method.

The present description illustrates the principles of the disclosure. It is thus to be understood that a person skilled in the art will be able to conceive of different arrangements which, although not explicitly described here, embody the principles of the disclosure and should likewise be protected in their entirety.

FIG. 1 illustrates the principle method of function of a head-up display. The head-up display 20 is mounted in the transportation vehicle 10 below/behind the instrument cluster in the dashboard region. Additional information is superimposed into the field of view of the driver by projection onto the windshield. The additional information appears as if it was projected onto a projection surface 21 at a distance of 7-15 m in front of the transportation vehicle 10. Yet the real world remains visible through this projection surface 21. Virtual surroundings, as it were, are created with the superposed additional information. The virtual surroundings are theoretically overlaid on the real world and contain the virtual objects that assist and inform the driver during the journey. However, projection takes place only onto part of the windshield so that the additional information cannot be arranged arbitrarily in the field of view of the driver.

Figure 2:
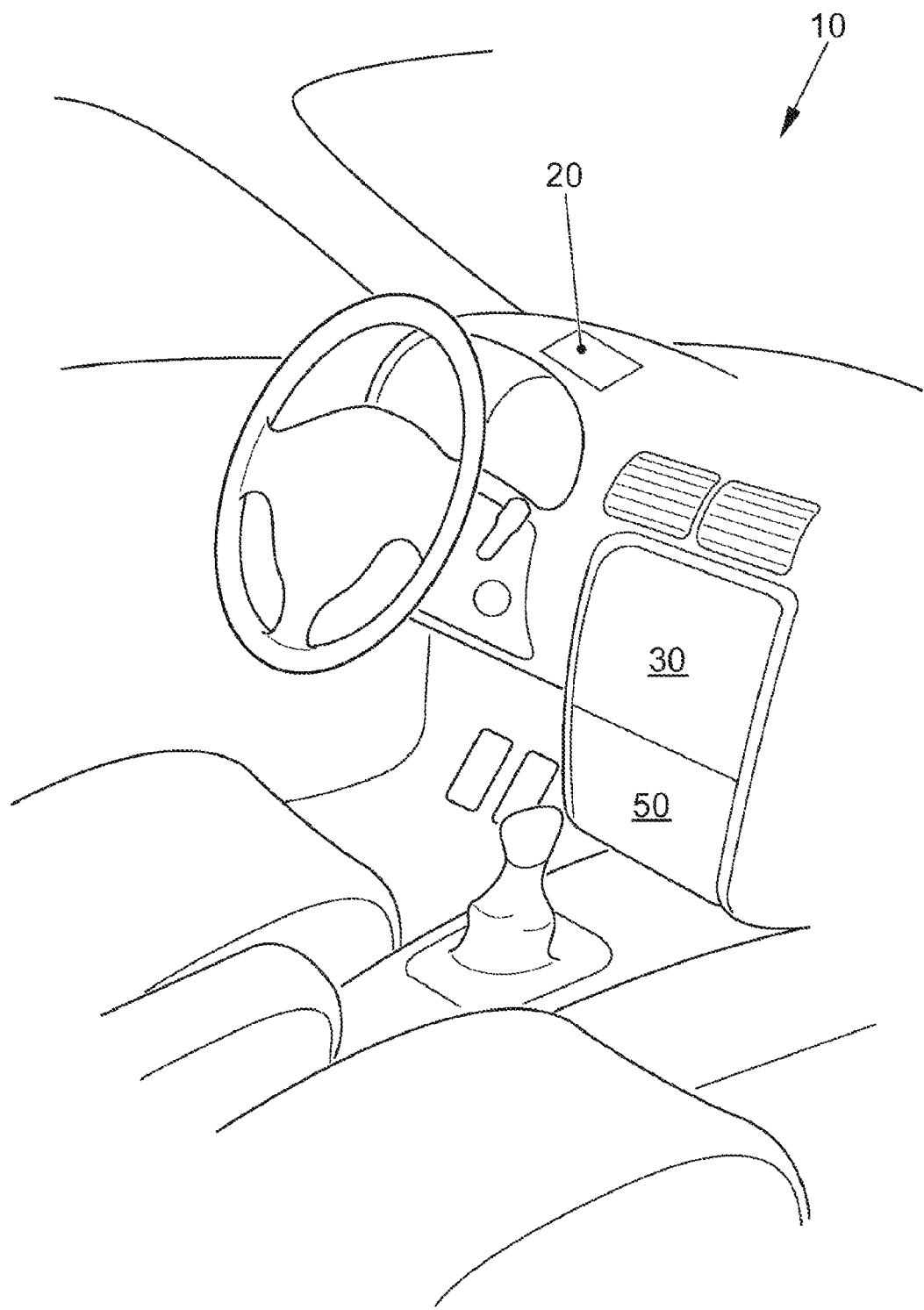
FIG. 2 shows the typical cockpit of a transportation vehicle.

FIG. 2 shows the cockpit of the transportation vehicle 10. It shows a passenger car. However, any other transportation vehicles are likewise conceivable as the transportation vehicle 10. Examples of further vehicles are buses, utility vehicles, in particular, trucks, agricultural machines, construction machines, rail vehicles, etc. The use of the disclosed embodiments would generally be possible for land vehicles, rail vehicles, watercraft, and aircraft.

In the cockpit, three display units of an infotainment system are shown. This is the head-up display 20 and a touch-sensitive screen 30, which is mounted in the center console. During the journey, the center console is not within the field of view of the driver. For this reason, the additional information is not superimposed on the display unit 30 during the journey.

The touch-sensitive screen 30 is here used for operating functions of the transportation vehicle 10. For example, it can be used to control a radio, a navigation system, playback of stored musical pieces, and/or an air-conditioning system, other electronic devices or other comfort functions or applications of the transportation vehicle 10. Together, this is frequently referred to as an "infotainment system." An infotainment system in transportation vehicles, specifically passenger cars, denotes the combination of car radio, navigation system, hands-free system, driver assistance systems and further functions in a central operating unit. The term infotainment is a portmanteau word of the words information and entertainment. To operate the infotainment system, mainly the touch-sensitive screen 30 ("touchscreen") is used, wherein this screen 30 can be seen easily and operated by a driver of the transportation vehicle 10, but also by a front passenger of the transportation vehicle 10. In addition, mechanical operating elements, such as keys, knobs or combinations thereof, such as, for example, push rotation controllers, can be arranged in an input unit 50 below the screen 30. Typically, steering wheel control is also possible from parts of the infotainment system. This unit is not illustrated separately but is considered to be part of the input unit 50.

Figure 3:
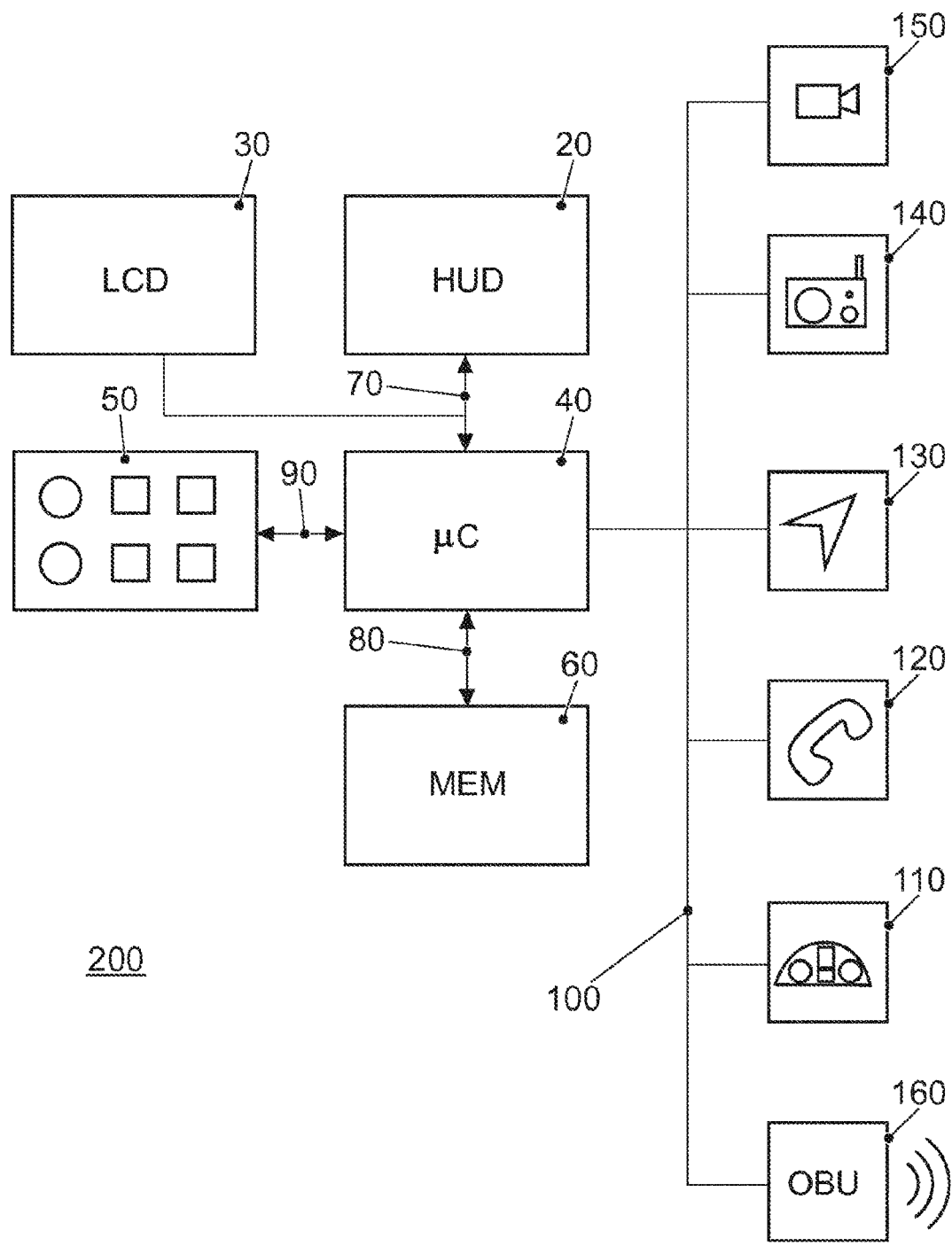
FIG. 3 shows the block diagram of the infotainment system of the transportation vehicle.

FIG. 3 schematically shows a block diagram of the infotainment system 200 and, by way of example, a few partial systems or applications of the infotainment system. The operating apparatus comprises the touch-sensitive display unit 30, a computation device 40, an input device 50, and a memory 60. The display unit 30 comprises both a display surface for displaying variable graphic information and also an operating area (touch-sensitive layer) arranged over the display surface for inputting commands by way of a user.

The display unit 30 is connected to the computation device 40 via a data link 70. The data link can be designed in accordance with the LVDS standard a.k.a. low voltage differential signaling. The display unit 30 receives control data for controlling the display surface of the touch screen 30 from the computation device 40 via the data link 70. Control data of the input commands are also transmitted via the data link 70 from the touch screen 30 to the computation device 40.

The reference numeral 50 denotes the input unit. It includes the already mentioned operating elements such as keys, knobs, sliders or rotation push controllers, with the aid of which the operator can effect inputs by way of the menu navigation. An entry is generally understood to mean the selection of a selected menu option and also the changing of a parameter, switching a function on and off, etc.

The memory device 60 is connected to the computation device 40 via the data link 80. A pictogram registry and/or a symbol registry is saved in the memory 60 with the pictograms and/or symbols for the possible superpositions of additional information. The points/symbols that serve as a basis for the computation of the grid superposition can also be saved here.

The further parts of the infotainment system camera 150, radio 140, navigation device 130, telephone 120 and instrument cluster 110, are connected to the apparatus for operating the infotainment system via the data bus 100. A suitable data bus 100 is the high-speed option of the CAN bus in accordance with the ISO standard 11898-2. Alternatively, the use of a bus system based on ethernet technology, such as BroadR Reach, is also possible. Bus systems in which the data transmission is effected via optical waveguides are likewise usable. Examples mentioned are the MOST bus (media-oriented system transport) or the D2B bus (domestic digital bus). It should also be mentioned here that the camera 150 can be designed as a conventional video camera. In this case, it records 25 frames/s, which corresponds to 50 fields/s in the interface recording mode 50. Alternatively, a special camera that records more images/s can be used to increase the accuracy of the object detection in the case of objects that move faster. A plurality of cameras can be used for vicinity observation. In addition, the above-mentioned RADAR or LIDAR systems can be used supplementarily or as an alternative to perform or expand vicinity observation. For wireless communication internally and with the outside, the transportation vehicle 10 is equipped with a communication module 160. This module is frequently also referred to as an on-board unit. It can be designed for mobile radio communication, for example, in accordance with the LTE standard a.k.a. long-term evolution. It can likewise be designed for WLAN communication, a.k.a. wireless LAN, be it for communication with devices belonging to passengers in the transportation vehicle or for vehicle-to-vehicle communication, etc.

The disclosed method for displaying a safety zone in front of a transportation vehicle or an object with the aid of a display unit will be explained below with reference to several exemplary embodiments.

It should be noted that for the further figures, identical reference numerals denote the same fields and symbols as explained in the description of the FIGS. 1 to 3.

As described above, the basis of the disclosed display of the safety zone is a virtual grid that is represented at a distance over the actual real environment. The real environment corresponds to the real course of the road.

Figure 4:
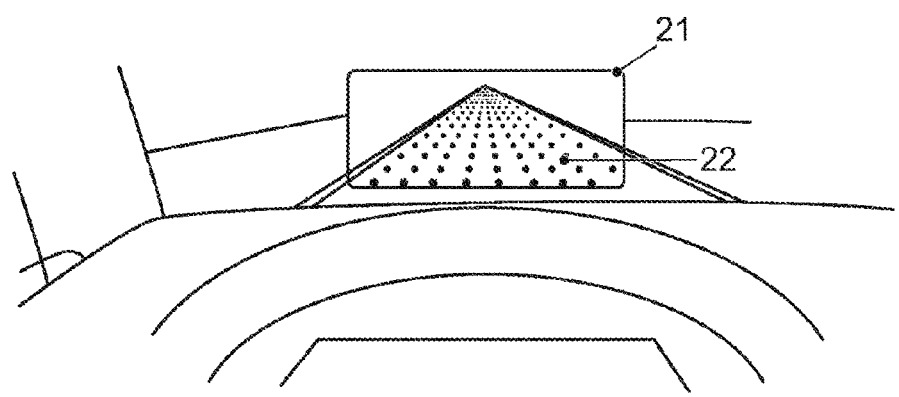
FIG. 4 shows two illustrations of grid superpositions for the display of driving direction courses, once on a straight route and once when driving through a bend.

FIG. 4 illustrates the principle of how information is superimposed into the field view of the driver with the aid of the head-up display 20. The reference numeral 21, in turn, denotes the projection surface of the head-up display 20. In the illustration, a grid 22 is superimposed along the course of the road.

In the following description, it is assumed that the driver drives the transportation vehicle 10 and the transportation vehicle is therefore not controlled fully automatically. An essential part of the driving task is that the driver uses the pedals and the steering wheel to control the speed and driving direction and consequently the longitudinal control and lateral control of the transportation vehicle. These actions taking place on what is known as the operational plane are essential for traffic safety and for preventing collisions with other road users.

This longitudinal and lateral control is effected by drivers continuously attempting during driving to maintain a safety zone around their transportation vehicle and to react by braking or steering if the safety zone is breached. This safety zone can be understood to be a region or a time within which the transportation vehicle can move safely and free from collision. The visualization of this safety zone with the aid of an augmented reality head-up display (AR-HUD) directly in the real environment therefore represents valuable assistance to the driver for managing the driving task.

The subject matter of the disclosure is the logic and visualization of the safety zone in the AR-HUD with the aid of a point grid.

Figure 5:
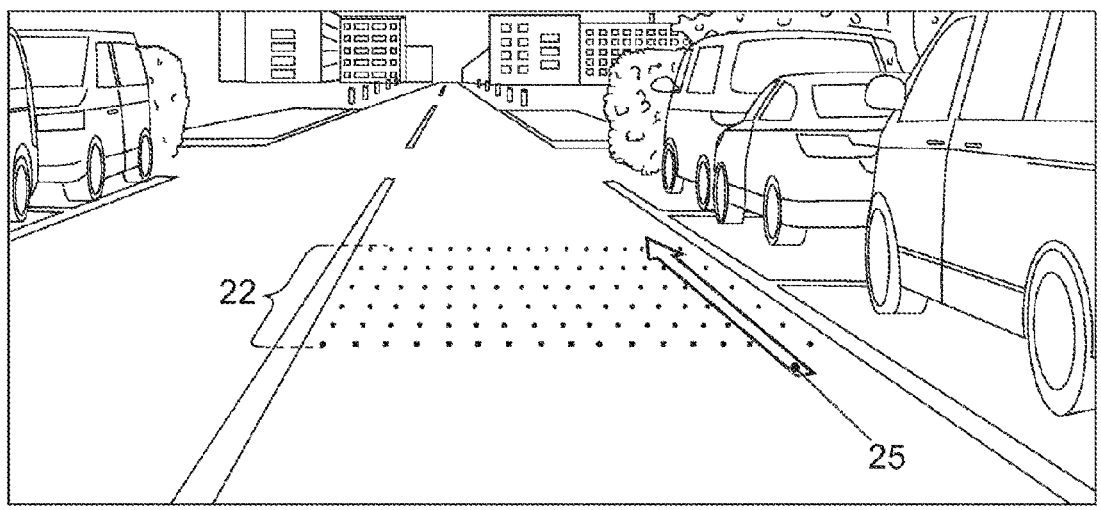
FIG. 5 shows the principle of the superposition of a safety zone into the field of view of the driver of a transportation vehicle as a grid.

FIG. 5 shows the principle of the superposition of a safety region into the field of view of the driver. The safety region is superposed as a point grid 22.

The extent of the point grid 22 was calculated such that it approximately corresponds to the braking distance of the transportation vehicle at the prevailing driving speed under the prevailing conditions, as indicated in FIG. 5 by way of the arrow. It is noticeable that the point grid 22 does not extend up to the front of the transportation vehicle. One reason for this is that the display region of the HUD in fact starts only some meters in front of the actual transportation vehicle. It is not yet possible to augment the street directly in front of the transportation vehicle using the HUD units which are technically available today. In any case, it makes sense to select a safety region that is more generous than the pure braking distance. The grid 22 is then merely superposed for the braking distance 25. It is possible that time will pass until the braking operation is initiated, which is not an included in the grid 22. Of course, it is possible in an alternative exemplary embodiment to represent the grid to be larger than the pure braking distance. In that case, the grid 22 would show the stopping distance.

In summary, for the calculation of the grid the following applies:

The grid 22 visualizes by way of its dimensions the braking distance. Any increase in speed therefore results in an increasing number of point lines of the grid due to the associated extension of the braking distance.

The grid 22 is dependent on the transportation vehicle behavior, is tracked during the journey, and is therefore understood to be vehicle-based rather than road-based (as opposed to, for example, navigation arrows in a navigation system).

The grid 22 follows the road and adapts to the course of the road, for example, in bends.

Figure 6:
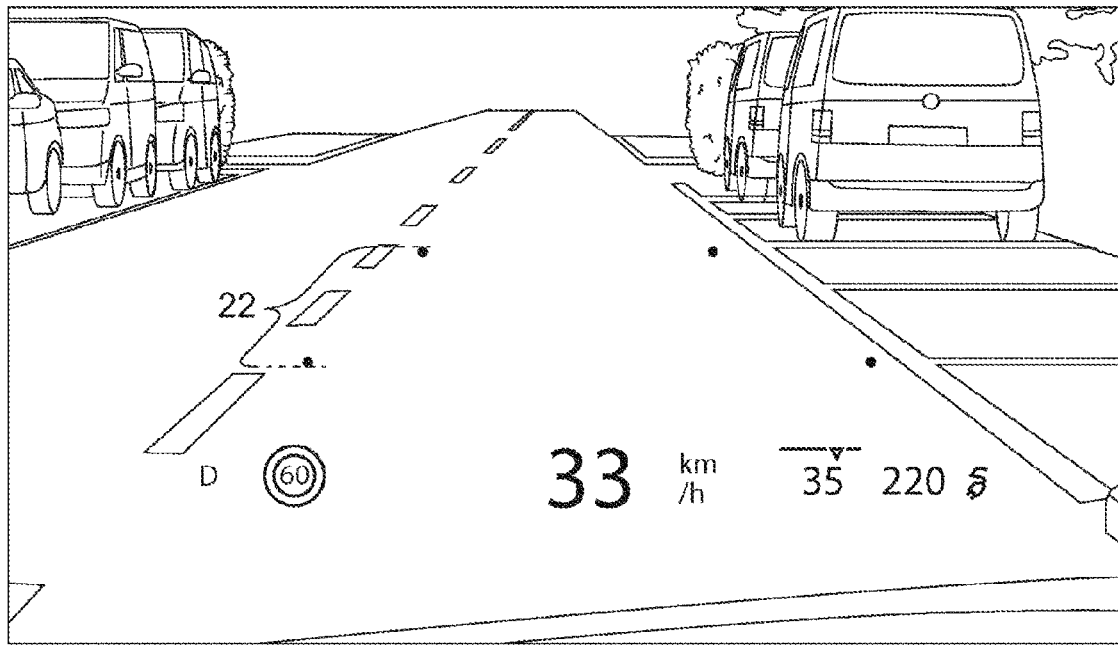
FIG. 6 shows a representation of a reduced superposition of a safety zone into the field of view of the driver of a transportation vehicle as a grid according to a first exemplary embodiment.
Figure 7:
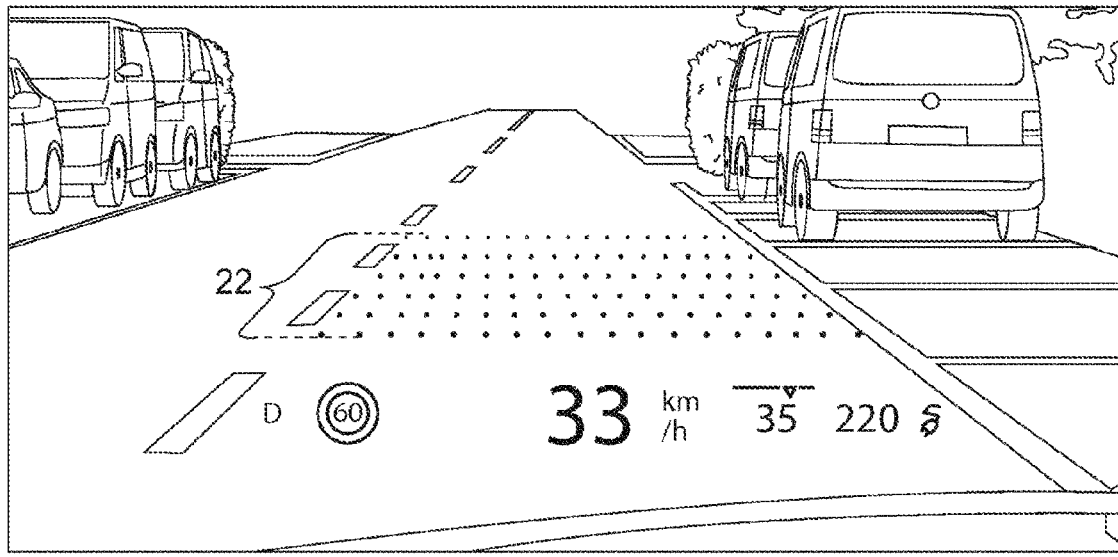
FIG. 7 shows an illustration of the complete superposition of a safety zone into the field of view of the driver of a transportation vehicle as a grid according to a second exemplary embodiment.

Depending on the traffic situation and potential for danger, there are different display states of the grid 22. At a higher escalation stage, there is also an acoustic warning for the driver. FIG. 6 shows the first example of the superposition of the safety region as a grid, where the grid 22 can be seen in a reduced form. During normal driving, only the 4 corner points of the grid 22 are indicated for displaying the activity of the system and at the same time to cover only little of the road scene. In addition, a few further pieces of information are superposed, which mean, from left to right, current gear (D), "allowed maximum speed" 60, "instantaneous driving speed" 33 km/h, set "target speed" of the cruise control system (GRA) 35 km/h, "remaining range" 220 km. The indications relate to an electric transportation vehicle.

If the transportation vehicle finds itself in a traffic situation that requires increased attention of the driver, for example, a traffic junction, the grid 22 is superposed entirely with white grid points in transparent form. The dimensions of the grid 22 continue to show in the longitudinal direction the length of the braking distance. This corresponds to the escalation stage 1, and the driver is thereby prepared to expect even situations which are difficult to foresee.

Figure 8:
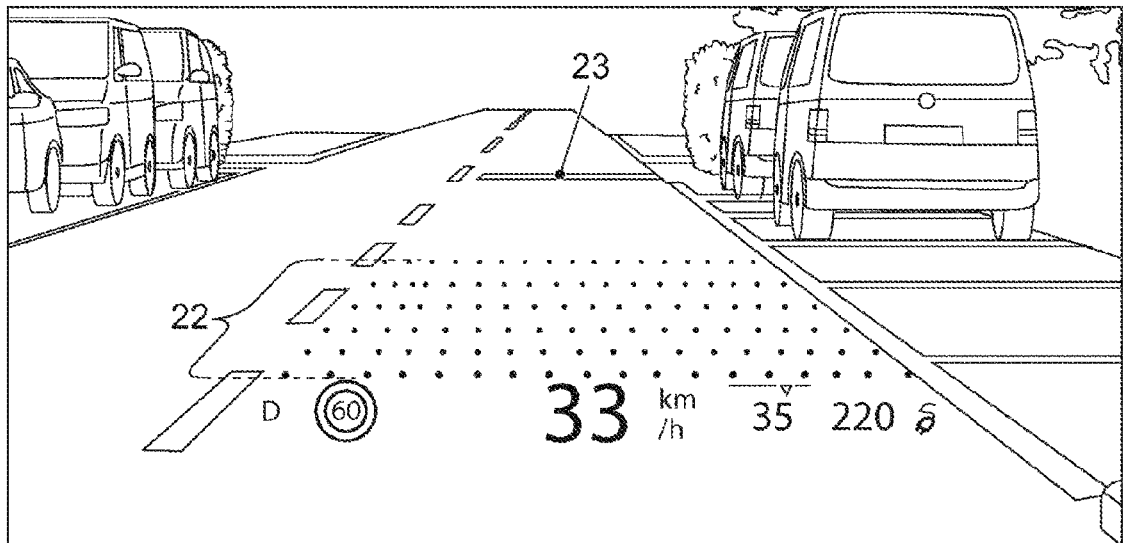
FIG. 8 shows an illustration of a superposition of a safety zone into the field of view of the driver of a transportation vehicle as a grid according to a third exemplary embodiment.

If the traffic situation requires an action by the driver in any case, this is made clear by way of a further augmentation in the environment. One examples of how this can be achieved is illustrated in FIG. 8. The figure illustrates the driving situation where the transportation vehicle approaches a right-before-left junction. Here, stopping in front of the intersecting lane is required in any case. To prepare the driver, an augmented white stopping line 23 is superposed at the location junction. This augmentation can be road-based as opposed to the vehicle-based grid 22. With this measure, the driver receives a behavior recommendation that is not present in the real environment.

Figure 9:
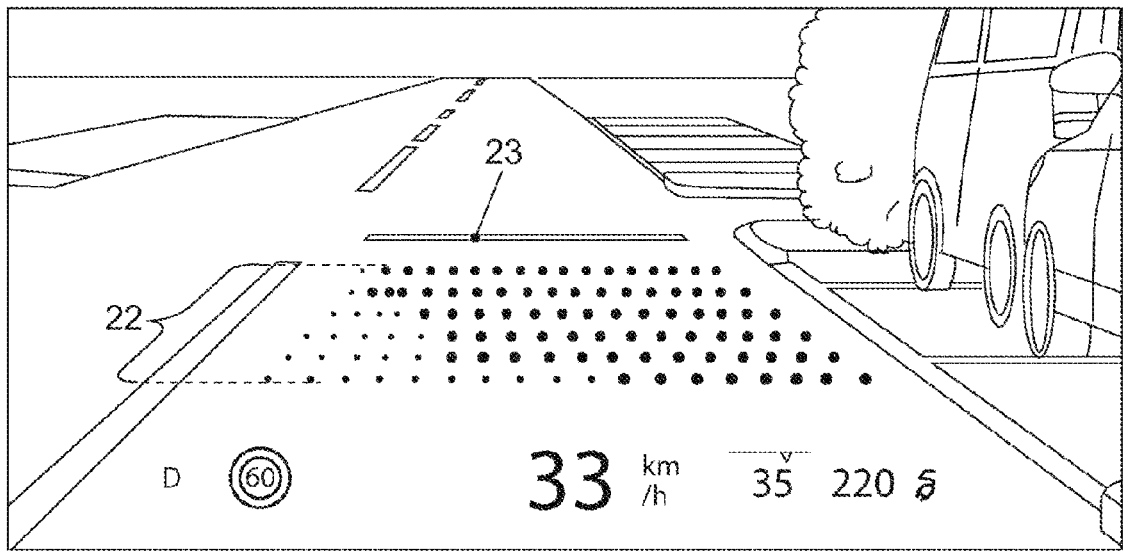
FIG. 9 shows an illustration of a superposition of a safety zone into the field of view of the driver of a transportation vehicle as a grid according to a fourth exemplary embodiment.

Upon detecting an imminent collision, for example, on account of the imminent entry of another road user into the transportation vehicle's own safety zone, the grid 22 is colored red. This is illustrated in FIG. 9. The grid is calculated here such that the coloration begins radially from the direction from which the other road user is to appear. The coloration of the grid is predictive, i.e. is effected even while the other transportation vehicle is still relatively far away from the junction. Frequently, the situation will be such that the on-board vicinity observation method or mechanism, such as the camera 150 or radar, cannot easily detect the other transportation vehicle. However, transportation vehicles will in future be crosslinked with one another by Car2Car communication so that they continuously exchange relevant information. This also involves the exchange of their position data. From the successive position data, the transportation vehicle 10 can estimate the movement of the approaching transportation vehicles and determine those transportation vehicles that are associated with a potential for collision/danger. By coloring the grid 22 from the side of the imminent danger, the driver is alerted, and their attention is drawn into that direction. The coloration corresponds to a second escalation stage.

Figure 10:
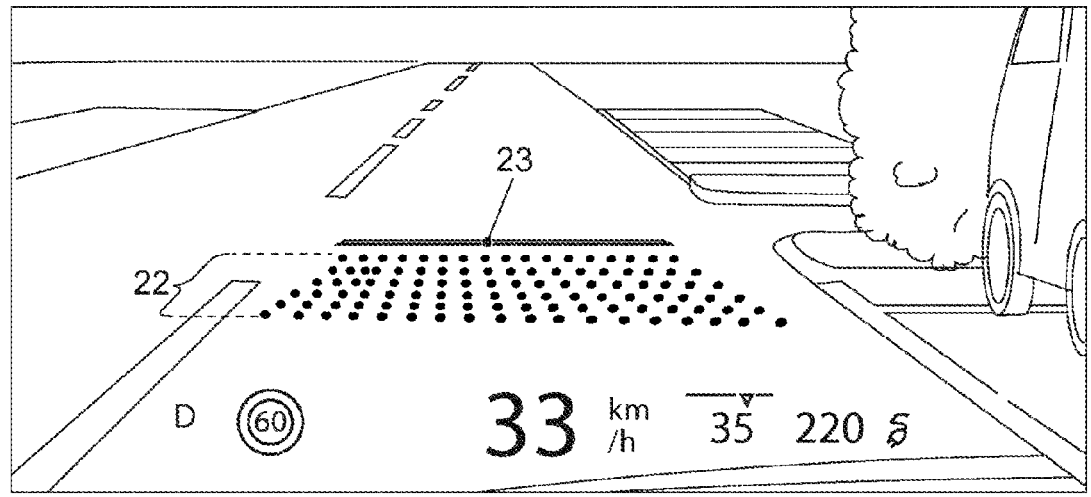
FIG. 10 shows an illustration of a superposition of a safety zone into the field a view of the driver of a transportation vehicle as a grid according to a fifth exemplary embodiment.

A further measure on the part of the second escalation state is performed when the front grid side reaches the superposed stopping line 23. This is shown in FIG. 10. The grid 22 is then compressed such that it ends in front of the stopping line 23. The compression can be accomplished such that the spacing of the grid rows decreases starting from the stopping line 23 to the vehicle-facing side, as is illustrated in FIG. 10. The grid 22 is thus not pushed into the junction. By compressing the grid lines, the stopping line 23 that is localized (road-based) at a specific location on the road is emphasized as compared to the vehicle-based grid 22. In addition, the stopping line is likewise additionally colored red.

One drawback is that the length of the grid 22 can no longer correctly visualize the braking distance due to the compression. However, this information in this situation increasingly recedes into the background. This measure gives the driver the information that is essential in the situation, specifically the location on the road at which they must absolutely come to a standstill. Due to the compression and the red coloration, only the available path distance rather than just the actual braking distance is now shown.

Figure 11:
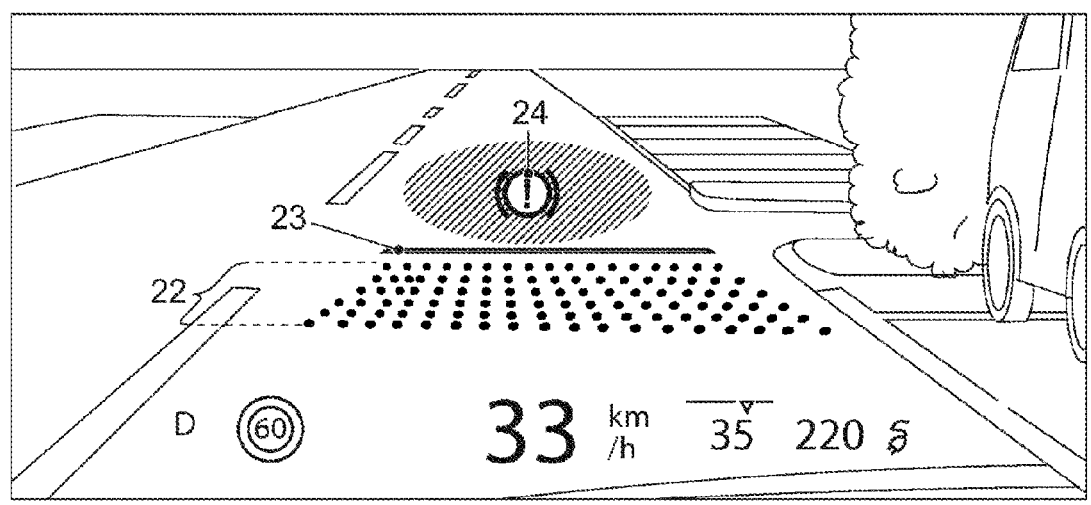
FIG. 11 shows an illustration of a superposition of a safety zone into the field of view of the driver of a transportation vehicle as a grid according to a sixth exemplary embodiment with a superposition of a brake request symbol.

Likewise, at the second escalation stage, see FIG. 11, an action symbol 24 that is represented as floating over the stopping line 23 in the road space can be superposed as an additional measure at the same time as the appearance of the augmented, red stopping line 23. The benefit of this additional measure consists in the symbol remaining visible due to its lifted position over the street surface even if the augmented stopping line 23 is located so close in front of the transportation vehicle 10 that it can no longer be displayed in the field of view of the head-up display 20. The action symbol 24 in the illustrated case corresponds to a 2D braking symbol.

Figure 12:
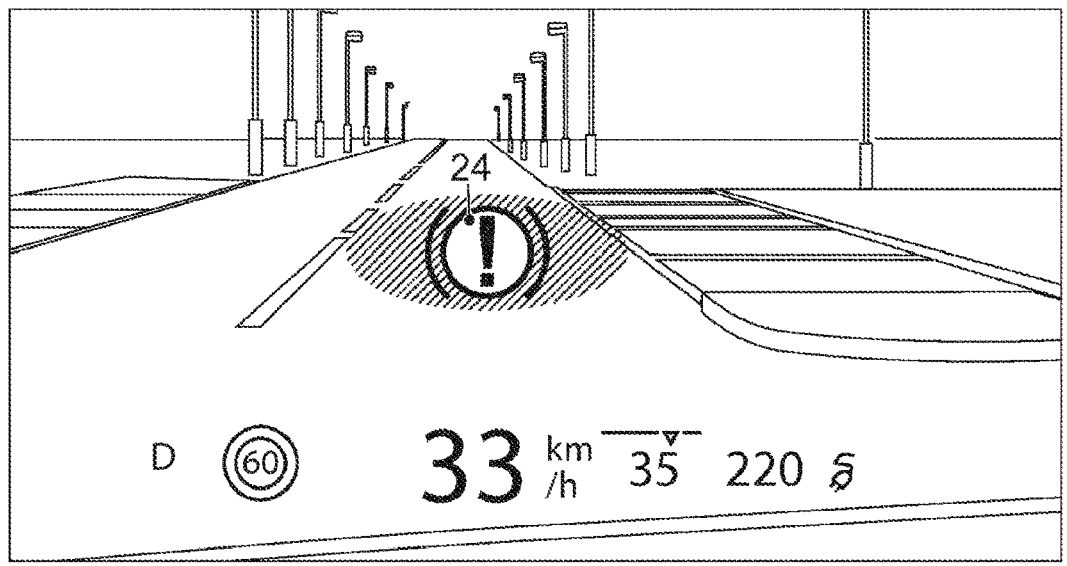
FIG. 12 shows the illustration of the superposition of a safety zone into the field of view of the driver of a transportation vehicle as a grid according to the fifth exemplary environment in which only the superposition of the brake request symbol is visible.

FIG. 12 still shows the action symbol 24, although the stopping line 23 has already disappeared from the field of view of the head-up display 20.

Figure 13:
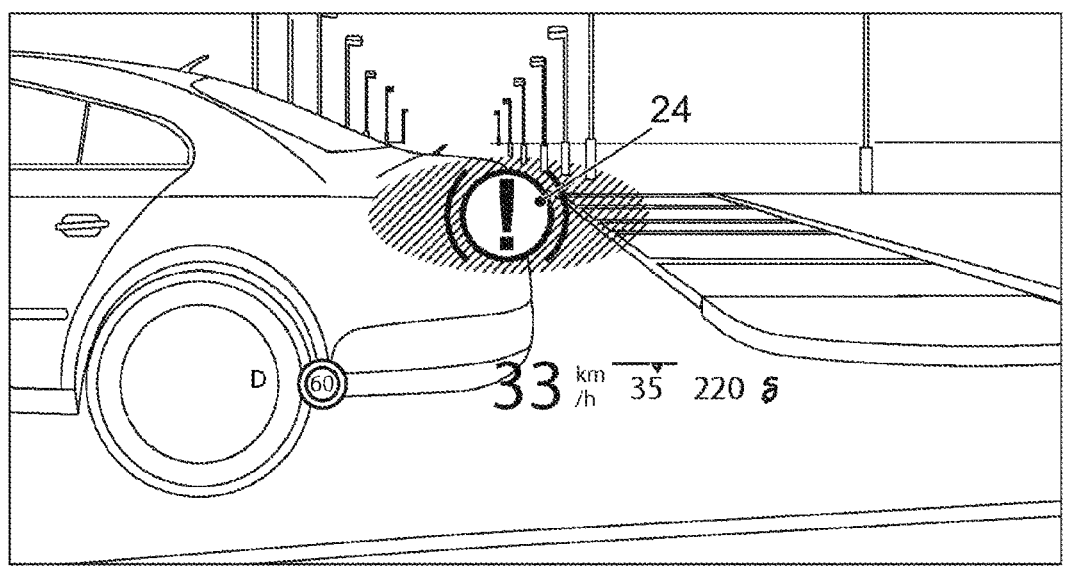
FIG. 13 shows the illustration of the superposition of a safety zone into the field of view of the driver of a transportation vehicle according to the fifth exemplary embodiment in an escalation stage in which only the superposition of the brake request symbol is visible, and the other road user that has entered the safety zone is likewise visible in the field of view of the driver.

FIG. 13 also illustrates the other transportation vehicle as it enters the region of the junction and, in the process, enters the safety region of the transportation vehicle 10. The action symbol 24 continues to be superposed.

Figure 14:
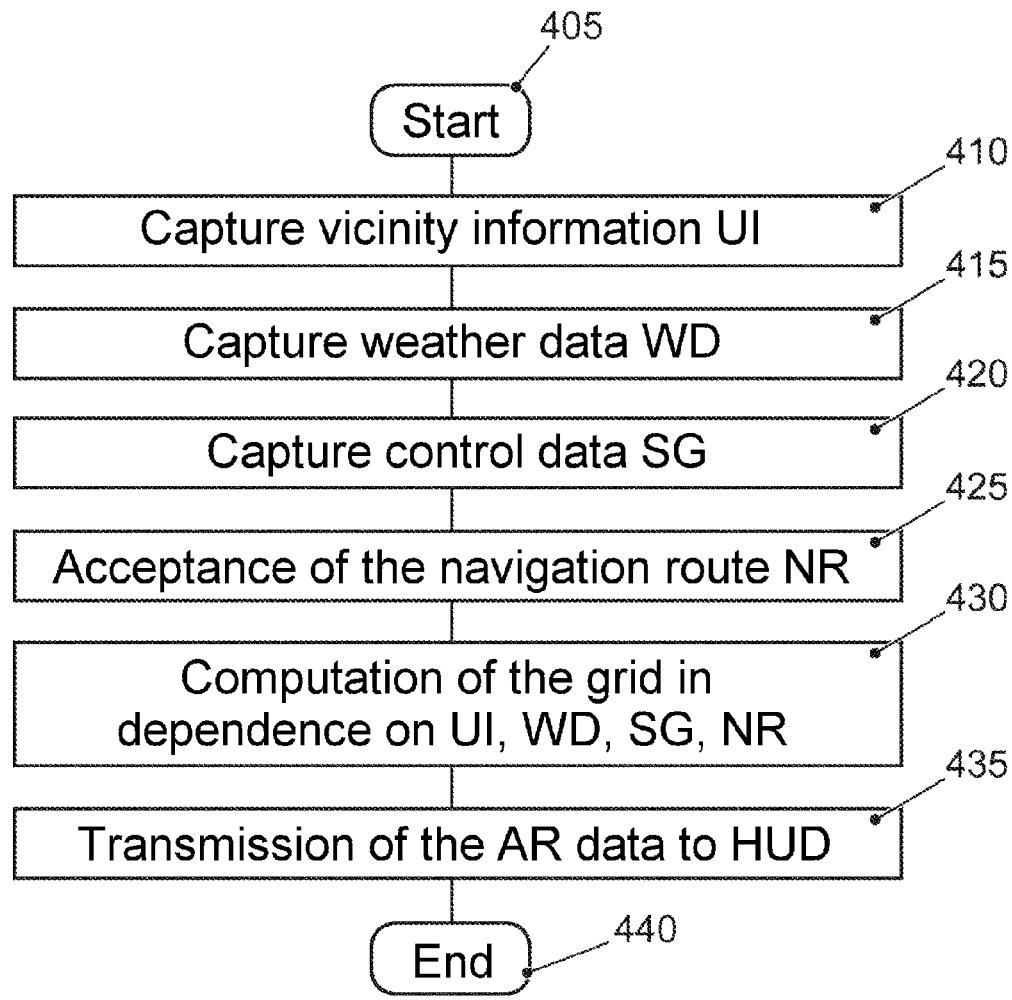
FIG. 14 shows a flow chart for a program for calculating the superposition of a grid for displaying the safety region according to an exemplary embodiment.

FIG. 14 now additionally shows the procedure of a program that is executed for performing the disclosed method in the computation unit 40.

The program start is indicated with the reference numeral 405. In program operation at 410, the vicinity information UI for the transportation vehicle 10 is captured. This is primarily accomplished with the aid of the already mentioned data transmitted via Car2Car communication from surrounding transportation vehicles. In addition, the image data recorded by the camera 150 are likewise evaluated, for example, to detect obstacles at the edge of the road. At the same time, in program operation at 415, the weather conditions are captured. It is very important here, for example, to note whether there is precipitation and also what kind of precipitation there is. This can be accomplished using a rain sensor or by measuring the speed of the wiper motor or likewise by way of an image evaluation method and the camera 150. The weather data also include other measurement values such as external temperature and air humidity. These data can be captured by on-board sensors. In an alternative exemplary embodiment, these data can also be retrieved by the on-board unit 160, for example, from an Internet page that makes available very exactly the local weather data WD. In the subsequent operation at 420, the current driving speed and the data relating to the current control process SG are captured. This information is available in the instrument cluster 110 and is transmitted into the computation unit 40 via the transportation vehicle bus 100. In program operation at 425, the navigation route NR, which originates from the navigation system 130, is evaluated. The system then knows, by way of the navigation route and the map data, which road junctions or road turns are coming up on the planned driving route. Next, in operation at 430, the grid 22 is calculated based on the captured parameters UI, WD, SG and the navigation route NR for the superposition on the head-up display 20. In other words, it is calculated where in the field of view of the driver the grid 22 is to be superposed and the dimensions the grid 22 is supposed to have and, for example, also, whether compression is necessary. Finally, the data for the superposition of the grid 22 are transmitted in operation at 435 to the head-up display 20. The latter then superposes the calculated grid 22 into the field of view of the driver. The program ends in program operation at 440.

All the examples mentioned here and also specific formulations should be understood without limitation to refer to such specifically mentioned examples. For example, a person skilled in the art will recognize that the block diagram illustrated here represents a conceptional view of an exemplary circuit arrangement. Similarly, it is clear that an illustrated flowchart, state transition diagram, pseudocode and the like represent various options for representing processes that are substantially stored in computer-readable media and can thus be performed by a computer or processor. The object mentioned in the patent claims can expressly also be a person.

It is to be understood that the proposed method and the associated apparatuses can be realized in various forms of hardware, software, firmware, special processors or a combination thereof. Special processors can comprise application-specific integrated circuits (ASICS), reduced instruction set computer (RISC) and/or field programmable gate arrays (FPGAs). The method proposed and the apparatus may be realized as a combination of hardware and software. The software may be installed as an application program on a program memory apparatus. This is typically a machine based on a computer platform having hardware, such as, for example, one or more central processing units (CPUs), a random-access memory (RAM) and one or more input/output (I/O) interfaces. Typically, an operating system is additionally installed on the computer platform. The various processes and functions that were described here can be a part of the application program or be a part that is executed via the operating system.

The disclosure is not limited to the exemplary embodiments described here. There is scope for various adaptations and modifications that a person skilled in the art would consider, owing to their expert knowledge, as also being part of the disclosure.

The disclosure is explained in more detail in the exemplary embodiments using the example of the use in transportation vehicles. The possibility of using it in aircraft and helicopters, for example, during landing maneuvers or search missions, etc., is also indicated.

However, it is noted that the use is not limited thereto. The disclosure can always be used where the field of view of a transportation vehicle, of an operator or simply just of a person having smartglasses can be enriched with AR superpositions.

Even in remote control devices such as robots, in which the remote control is effected via a monitor on which a camera image is shown, AR superpositions can make operation easier. Consequently, this represents another possible use.

LIST OF REFERENCE SIGNS

10 Transportation vehicle
20 Head-up display HUD
21 Virtual projection surface
22 Grid
23 Virtual stopping line
24 Action symbol
25 Braking distance
30 Touch-sensitive display unit
40 Computation unit
50 Input unit
60 Memory unit
70 Data link to the display unit
80 Data link to the memory unit
90 Data link to the input unit
100 Data bus
110 Instrument cluster
120 Telephone
130 Navigation device
140 Radio
150 Camera
160 Communication module
200 Infotainment system
405—Various
440 Program operations
UI Data for vicinity information
WD Weather data
SG Control data, vehicle speed
NR Navigation route

The invention claimed is:

1. A method for displaying a safety zone in front of a transportation vehicle or an object with the aid of a display unit, the method comprising:

capturing speed and surroundings data for the transportation vehicle or for the object;

calculating a grid that represents the safety zone of the transportation vehicle or object based on the speed and the captured surroundings, the grid being a point grid; and superposing, in response to the transportation vehicle being at a first predetermined distance from a virtual stopping line, the grid that represents the safety zone in the field of view of the driver or of the object, wherein a vehicle-remote end of the grid indicates the end of the safety zone at the measured speed and the captured surroundings, wherein, in response to the transportation vehicle being at a second predetermined distance from a virtual stopping line that is closer to the virtual stopping line than the first predetermined distance, the grid is calculated and displayed in a compressed view so that all grid points originally shown in the superposed grid are positioned in front of the stopping line in response to a location of the grid being calculated so the vehicle-remote end of the grid reaches the stopping line, wherein the point grid is displayed in full in response to a determined level of risk associated with the captured speed and surroundings data being above a predetermined threshold, and wherein the point grid is displayed as a reduced grid, in which only the corner points of the grid are displayed, in response to the determined level of risk associated with the captured speed and surroundings data being below the predetermined threshold.

2. The method of claim 1, wherein the safety zone illustrates the braking distance or the stopping distance of the transportation vehicle.

3. The method of claim 1, wherein the grid is represented in full for a driving situation that was assessed as requiring increased attention by the driver and/or a virtual stopping line is superposed at a location of the driving path in front of the superposed grid at which the increased attention of the driver is required.

4. The method of claim 3, wherein the driving situation that was assessed as demanding increased attention by the driver, corresponds to driving on a road that does not have priority while approaching a crossroad or junction with priority that must be observed.

5. The method of claim 3, wherein the grid is represented with a color emphasis in response a driving situation that predicts another road user entering the safety zone in front of the transportation vehicle.

6. The method of claim 5, wherein the coloration is dynamic, wherein the grid points are colored radially from the direction from which the other road user presumably enters the safety zone in front of the transportation vehicle.

7. The method of claim 1, wherein the virtual stopping line is colored.

8. The method of claim 1, wherein one or more action request symbols are superposed.

9. The method of claim 8, wherein the action request symbol is superposed it so the action request symbol is represented as floating over the virtual stopping line.

10. An apparatus for performing a method for displaying a safety zone in front of a transportation vehicle or an object with the aid of a display unit, the apparatus comprising:
   a display unit with which virtual additional information can be superposed into the field of view of the driver or of the person operating the object; and
   a computation unit,
   wherein the transportation vehicle captures the speed and the surroundings of the transportation vehicle,
   wherein the computation unit calculates a grid based on the speed and the captured surroundings for displaying the safety zone,
   wherein the grid that represents the safety zone is superposed in the field of view of the driver or of the object displayed on the display unit,
   wherein the vehicle-remote end of the grid indicates the end of the safety zone at the measured speed and the captured surroundings,
   wherein the grid is represented with a color emphasis in response a driving situation that predicts another road user entering the safety zone in front of the transportation vehicle, and
   wherein the coloration is dynamic, wherein the grid points are only colored on a side portion of the grid corresponding to the direction from which the other road user presumably enters the safety zone in front of the transportation vehicle,
   wherein the point grid is displayed in full in response to a determined level of risk associated with the captured speed and surroundings data being above a predetermined threshold, and
   wherein the point grid is displayed as a reduced grid, in which only the corner points of the grid are displayed, in response to the determined level of risk associated with the captured speed and surroundings data being below the predetermined threshold.

11. The apparatus of claim 10, wherein the display unit is a head-up display or smartglasses.

12. The device of claim 10, wherein the safety zone illustrates the braking distance or the stopping distance of the transportation vehicle.

13. The device of claim 10, wherein the grid is represented in full for a driving situation that was assessed as requiring increased attention by the driver and/or a virtual stopping line is superposed at a location of the driving path in front of the superposed grid at which the increased attention of the driver is required.

14. The device of claim 13, wherein the driving situation that was assessed as demanding increased attention by the driver, corresponds to driving on a road that does not have priority while approaching a crossroad or junction with priority that must be observed.

15. A transportation vehicle, comprising the apparatus of claim 10.

16. A non-transitory computer readable medium including a computer program that includes instructions which, when executed in a computation unit, control the apparatus of claim 10, to display a safety zone in front of a transportation vehicle or an object.

* * * * *